May 8, 1934. F. A. DEUTSCH 1,957,529
SHOCK ABSORBER FOR MOTOR VEHICLES
Filed Nov. 16, 1931
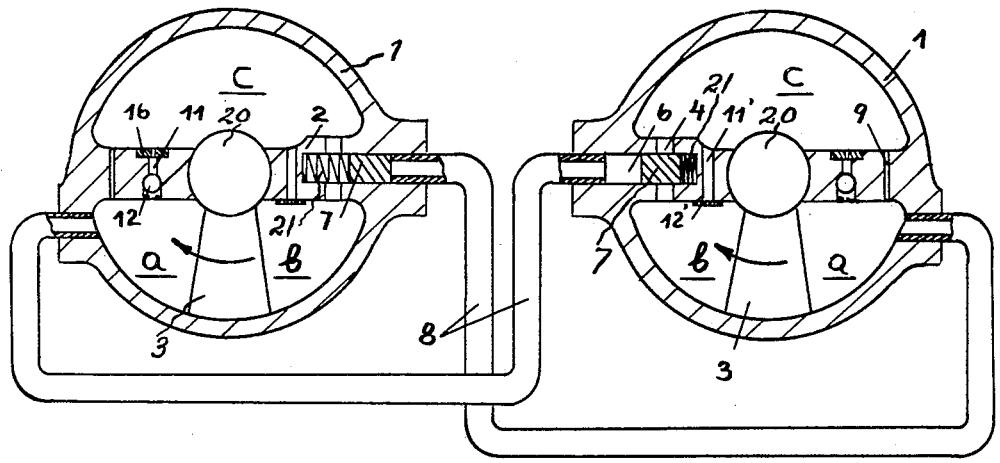

Patented May 8, 1934

1,957,529

UNITED STATES PATENT OFFICE 1,957,529

SHOCK ABSORBER FOR MOTOR VEHICLES

Fritz Albert Deutsch, Berlin, Germany

Application November 16, 1931, Serial No. 575,385
In Germany November 12, 1930

2 Claims. (Cl. 267—11)

My invention relates to shock absorbers for use on motor vehicles of the type in which springs are interposed between the vehicle body and the running gear. In vehicles of this kind there is a distinction between the comparatively slow "body oscillations" with respect to the road and the much more rapid "wheel oscillations" with respect to the body of the vehicle.

An object of the present invention is to produce a shock absorber so designed that a most effective braking or damping action is opposed to the body oscillations so that the latter will be quickly absorbed and that, at the same time, the braking or damping action remains ineffective as far as the wheel oscillations are concerned, so that the movements of the wheels are transmitted to the vehicle body as slightly as possible.

The shock absorber embodying the present invention is of the hydraulic type comprising an operating chamber, a refill chamber, and a damping member movable in the operating chamber, and in this connection a feature of the invention resides in the provision of a liquid transfer passage between said chambers, which passage is so proportioned or controlled as to permit, during comparatively slow body oscillations, liquid to be transferred from the refill chamber to the operating chamber to keep the latter filled with liquid, whereas during rapid wheel oscillations the transfer of liquid from the refill chamber to the operating chamber is throttled, whereby the action of the movable damping member against such rapid oscillations is made substantially ineffective.

The shock absorber according to this invention is, moreover, so designed as to exercise, apart from its shock absorbing action, and in conjunction with a duplicate, companion shock absorber, a stabilizing effect upon the vehicle. That is to say, two of the present shock absorbers combined and operating in accordance with the invention effectively oppose side sway or tendency of the vehicle body to turn about its longitudinal axis, thereby compelling the vehicle body to remain substantially in a position parallel to the road surface. A vehicle thus stabilized can be driven, without any risk or danger, at considerable speed around curves.

In the annexed drawing I have, by way of illustration, shown an embodiment of my invention.

As shown, the shock absorber comprises two casings, 1, 1, which in well-known manner are mounted at the respective sides of the vehicle, the shock absorber arms (not shown) which are keyed to the shafts 20 being connected to the wheel axle, and the casings 1, 1 being secured to the vehicle chassis or body. Each casing, 1, is divided by a partition, 2, and a blade or piston 3, into two operating chambers $a$ and $b$ and a refill chamber $c$. Each operating chamber $a$ is hereinafter termed the high-pressure chamber and the operating chamber $b$ the low-pressure chamber. In the partition 2 between the refill chamber $c$ and the high-pressure chamber $a$ of each casing is provided a bore 11, in which is mounted a check valve 12 permitting liquid to flow from $c$ to $a$, but not vice versa. At one end, each bore 11 is closed by a plate 16 having a minute opening therein.

Formed through the partition 2 of each casing between the refill chamber $c$ and the low-pressure chamber $b$ are two ports 11' and 4. The ports 4 are controlled by piston valves 7, 7, respectively, which normally are held open by springs 21, 21, respectively. Each casing has its high pressure chamber $a$ connected by a pipe 8 with the chamber of the other casing in which operates the valve 7, the arrangement in this respect being such, as shown, that when the movable member 3 of either shock absorber is moved into its high pressure chamber $a$ the resulting liquid pressure closes or tends to close the valve 7 of the other casing.

The connecting ports 11' between the refill chambers $c$ and the low-pressure chambers $b$ are controlled by check valves 12' so that through said ports 11' the liquid can flow only in the direction of the chambers $b$.

Formed through the partition 2 of each casing and providing constant communication between the refill chamber $c$ and the high pressure chamber $a$ is a liquid metering duct 9.

The operation is as follows:—

Normally both devices act only as ordinary shock-absorbers, in which case the blades 3 always move in opposite directions, that is to say, while the blade in the device on the left hand side moves clockwise, the blade in the device on the right hand side moves counter-clockwise. In both devices, therefore, the same shock-absorbing effect takes place. If, for example, upon the compression of the springs the blade 3 in the device on the left moves counter-clockwise while the blade in the device on the right moves clockwise, liquid can flow through the open ports 4 practically unobstructed from the low-pressure chambers $b$ into the only partially filled refill-chambers $c$. Now, when the two blades move in the reverse direction, which occurs upon reflex action of the previously compressed vehicle springs, the blade 3 in the device on the left will move clockwise and the blade in the device on the right anti-clockwise. In this case, the liquid, against comparatively great resistance, is forced through the narrow openings 9 into the refill chambers c. The resistance opposed to the liquid while thus being forced into the refill chamber represents the shock absorbing effect.

When the vehicle passes around a curve, the blades will move as illustrated by the arrows on the drawing. The blade 3 on the left, for instance, will move clockwise toward the high-pressure chamber a, while the blade on the right will also move clockwise, but toward the low-pressure chamber b. The result is that the pressure produced in the high-pressure chamber a of the left hand shock absorber is transmitted through the conduit 8 and displaces the piston valve 7 in the right hand shock absorber against the action of the spring 21, thereby closing the port 4 of the right hand shock absorber. Consequently, the blade 3 of the right hand shock absorber can move clockwise only against a very great resistance, since the liquid can escape only because of the slight play between the blade 3 and casing 1. The result is a strong stabilizing effect opposing any tilting tendency of the vehicle.

Irrespective of whether the respective devices operate only as shock absorbers or both as shock absorbers and stabilizers, one of the important purposes of the invention is to provide means to prevent either device, whether used alone or in association with a companion device, from acting to transmit rapid wheel oscillations to the vehicle body. This object is attained by the throttling nozzle in the plate 16, which nozzle prevents any considerable amount of liquid flowing from the refill chamber c into the high-pressure chamber a within the short space of time when, during the rapid wheel oscillations for example, the blade 3 moves into the low pressure chamber b. Thus, when the blade 3 moves back into the high pressure chamber a it will encounter no resistance. That is to say, during rapid wheel oscillations, the blade 3 upon moving into the low pressure chamber b encounters little or no resistance in subsequently moving into the high pressure chamber a.

It is obvious that very favorable conditions can easily be obtained by a proper selection of the dimension of the throttling opening in plate 16. The invention is based on the fact that during the comparatively slow oscillations of the vehicle body relative to the road there is sufficient time for the liquid to flow into the high-pressure chamber, while during the much more rapid oscillations of the wheels only a negligible amount of liquid can flow into the high-pressure chamber. In the latter event, therefore, the high pressure chamber will be practically empty because of the throttling action of nozzle 16, so that no pressure will be opposed to the movements of the blade.

This construction results in the following great advantages:

1. Because of the fact that the shock absorber during the rapid wheel oscillations remains practically inactive, it can be constructed so as to be extremely effective for opposing the body oscillations of the vehicle.

2. When there is no liquid and therefore no pressure in the high-pressure chamber, the piston valve 7 in the shock absorber connected to said high-pressure chamber remains inactive, and, therefore, also any stabilizing effect is eliminated. Consequently, the upward movement of one wheel remains unaffected by the downward movement of the opposite wheel.

What I claim as new is:

1. In combination, a pair of shock absorbers each including a casing having a refill chamber and high and low pressure operating chambers, a movable piston separating the high and low pressure operating chambers of each shock absorber, a normally open valve controlled communication between the refill chamber and the low pressure chamber of each shock absorber, means providing constant communication between the refill chamber and the high pressure chamber of each shock absorber, a connection between the high pressure chamber of each shock absorber and the valve of the other shock absorber whereby the liquid pressure resulting from movement of the piston of either shock absorber into its related high pressure chamber closes the valve of the other shock absorber, and check valve controlled means permitting flow of liquid from the refill chamber of each shock absorber into both the high and the low pressure operating chambers thereof and preventing flow of liquid from the latter chambers into the refill chamber.

2. The combination as set forth in claim 1 including means to throttle the flow of liquid from the refill chamber to the high pressure chamber to such an extent as to permit relatively free flow of liquid from the refill chamber into the high pressure chamber only during relatively slow movements of the piston and to practically deny any appreciable flow of liquid from the refill chamber into the high pressure chamber during rapid movements of the piston.

FRITZ ALBERT DEUTSCH.